April 30, 1968     D. M. HARVEY     3,380,357
MULTILAMP FLASH PHOTOGRAPHY SIGNAL MEANS INDICATING
THE NUMBER OF SUCCESSIVE, GOOD FLASH LAMPS
Filed July 12, 1965
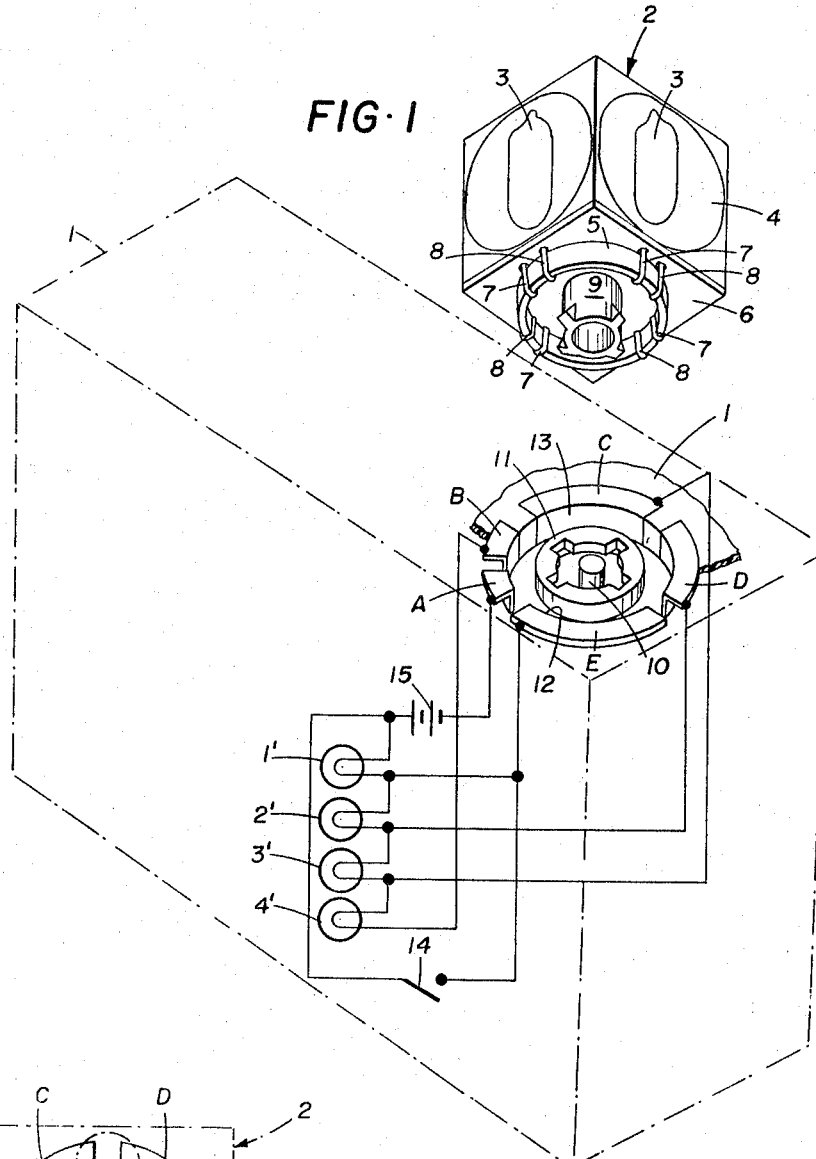
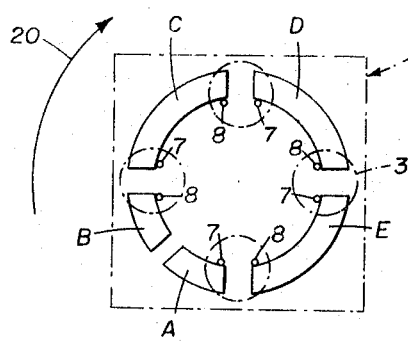
DONALD M. HARVEY
INVENTOR.
BY R. Frank Smith
Thomas R. Lampe
ATTORNEYS

United States Patent Office 3,380,357
Patented Apr. 30, 1968

3,380,357
MULTILAMP FLASH PHOTOGRAPHY SIGNAL MEANS INDICATING THE NUMBER OF SUCCESSIVE, GOOD FLASH LAMPS
Donald M. Harvey, Rochester, N.Y., assignor to Eastman Kodak Company, Rochester, N.Y., a corporation of New Jersey
Filed July 12, 1965, Ser. No. 471,012
6 Claims. (Cl. 95—11.5)

ABSTRACT OF THE DISCLOSURE

The signal means includes socket means for a plurality of flash lamps and an electrical circuit with a plurality of signal lamps connected to the socket such that the signal lamps indicate the number of successive, good flash lamps installed in the socket, starting with the flash lamp which is in the firing position. For any bad flash lamp the corresponding signal lamp and every successive signal lamp will be out.

---

The present invention relates to a signaling device for use with cameras which utilize disposable, rotatable, multilamp flash attachments of the type disclosed in copending Kottler U.S. application Ser. No. 417,914, now Patent No. 3,327,105 filed Dec. 14, 1964.

In cameras utilizing attachments of this type, means is normally provided for automatically rotating the attachment after a flash operation so that an unused bulb is presented to the front of the camera in position for succeeding flash use. One such means is disclosed in copending Williams et al. U.S. application Ser. No. 438,585, now Patent No. 3,335,651, filed Mar. 10, 1965.

After the last unused bulb is fired, the attachment is automatically indexed as before and a previously fired bulb will then be presented toward the front of the camera and placed in operative association with the camera synchroflash system. Unless the operator has kept track of the number of previously fired bulbs, he may inadvertently initiate operation of the camera, expecting the flash bulb to be actuated, when a previously used bulb is positioned in operational relationship to the camera synchroflash system.

It is therefore an object of this invention to provide means which will indicate to the camera operator the number of successive good lamps remaining in a multilamp flash attachment.

This objective has been attained in the present instance by providing a visual signal means which will automatically indicate to the operator how many lamps remain in the multilamp flash attachment that are capable of being actuated by the camera synchroflash system.

Other objects of the invention will appear from the following description, reference being made to the accompanying drawings, wherein:

FIG. 1 is a schematic view of the basic elements of a photographic camera embodying one form of the present invention and illustrating a multilamp flash attachment in a position preparatory to engagement with the camera;

FIG. 2 illustrates the relative positions of wires of the flash bulbs employed in the multilamp attachment and the contact segments of the signal means when such elements are in operable position.

Referring now to FIG. 1, a typical camera 1 is illustrated in phantom. A multilamp flash attachment 2 of the type disclosed in aforementioned application Ser. No. 417,914 is shown in position just prior to being placed in operative position with the camera. It may readily be seen that attachment 2 is substantially cube-shaped and accommodates one flash bulb 3 in each of four reflective recesses 4 formed in the cube. An annular ring 5 extends downwardly from base member 6. Two electrical lead-in wires 7, 8 extend downwardly from each bulb and are crimped about the annular ring 5 as shown. Lead-in wires 7, 8 are connected to their respective bulbs 3 in the conventional manner and are adapted to be placed in the camera synchroflash circuit in a manner to be described. A projection 9 also extends downwardly from base member 6 and is located along the central axis of attachment 2.

Projection 9 is adapted to extend through aperture 10 in rotatable socket member 11 and adapted to be held therein by any desired expedient. One such expedient for holding a projection of this type in its socket is disclosed in copending Petersen et al U.S. application Ser. No. 417,913, now Patent No. 3,353,465, filed Dec. 14, 1964. Briefly, projection 9 is yieldingly engaged by a spring clip member (not shown) which is recessed in the socket member so that attachment 2 will be rotated with said socket member.

In the present embodiment, socket member 11 is rotatably mounted in any suitable fashion in a circular recess 12 formed in the camera housing. A drive means, such as the one disclosed in copending Williams et al U.S. application Ser. No. 438,585, filed Mar. 10, 1965, may be used for rotation of said socket member. As is more fully disclosed in application Ser. No. 438,585, the socket is rotated at 90° increments whenever the film in the camera is advanced so that the attachment 2 is indexed a like amount and an unused bulb 3 is positioned toward the front of the camera for flash purposes.

Extending about the periphery of recess 12 and substantially flush with circular wall 13 thereof are curved contact segments A–E, constructed of any electrically conductive material, which are suitably insulated from the camera housing. Upon insertion of projection 9 of attachment 2 into the socket member in the manner previously described, annular ring 5 projects into recess 12. Lead-in wires 7, 8 from the flash-bulbs 3 contact the segments A–E in the manner shown in FIG. 2, wherein attachment 2 and bulbs 3 are illustrated in phantom.

Referring once again to FIG. 1, it may be seen that each of segments A–E has an electrical conductor connected thereto operatively associated with the camera synchroflash system which comprises a shutter actuated synchronization switch 14 in series with battery 15. A wire lead runs from the battery 15 to contact segment A while the synchronization switch 14 is lead connected to segment E. When a bulb 3 is positioned toward the front of the camera by means of the rotatable socket member and associated drive means (no shown), wire lead 7 thereof is in contact with segment A while wire lead 8 contacts segment E, thus placing the forward flash bulb in series with the camera synchronization system. Closing of switch 14 will complete the circuit and the forward facing bulb will be fired in the usual manner.

A series of four microminiature lamps 1', 2', 3', 4' are also tied into the battery 15 in the manner shown. Microminiature lamps 1', 2', 3', 4' are lead connected to segments A–E in such a manner that each lamp is interconnected to two adjacent segments. Assuming that all four lamps are in good working order and the attachment is properly in position as indicated in FIG. 2, all of the segments will be bridged by lead wires 7, 8. Current will therefor flow through all of the flash lamps and through all contact segments A–E thereby lighting microminiature lamps 1', 2', 3' and 4'. The microminiature lamps may be positioned in any desired manner with respect to the camera housing so that the operator may view them. One suitable arrangement would be to locate them so they may be observed through the viewfinder window of the camera (not shown). In the present arrangement, lamp 1' indicates to the operator that the forward facing bulb, i.e. the bulb contacting segments A and E is in working order. Similarly, lamp 2' indicates that the second bulb to be fired, i.e. the bulb contacting segments D and E is in operating order, and so on. Since none of the bulbs has been fired, all four indicator microminiature lamps will light, relaying this information to the operator.

The microminiature lamps have sufficient resistance to prevent the bulbs from firing. However, when synchronization switch 14 is closed, a direct short will be established across segments A and E thereby firing the forward facing flash bulb.

Assuming now that the socket member 11 and multilamp attachment 2 are rotated 90° in the direction of arrow 20 (FIG. 2), the previously fired bulb will now be indexed so that it contacts segments B and C and the newly presented unused bulb will contact segments A and E. The circuit will therefore be broken across segments B and C and microminiature lamp 4' will go out, indicating to the operator that the flash bulb across such segments has been used. Lamps 1', 2' and 3' will remain lit since a circuit remains completed across segments A-E, E-D and D-C due to the fact that these segments are contacted by lead-in wires 7, 8 of the remaining three unused flash bulbs.

Upon firing of the succeeding flash bulbs and subsequent rotation of the socket member, microminiature lamps 3', 2' and 1' will go out sequentially and in that order by virtue of the fact that the circuit will be broken across their respective associated contacts. When all of the lamps have gone out, the operator will know that all of the flash bulbs have been previously used and that a new multilamp attachment must be inserted in the camera for additional flash pictures.

In the circuit shown, the signal means is actuated directly upon insertion of a multilamp attachment. If desired, however, a separate switch may be provided in the circuit to disconnect the battery when use of the camera is not desired and the multilamp attachment is to remain associated with said camera.

Although only one specific embodiment of the present invention is disclosed herein, it should be understood that the particular form disclosed has been selected to facilitate explanation of the invention rather than to limit the number of forms which it may assume. Further, it should be understood that various modifications, alterations, and adaptations may be applied to this specific form described to meet the requirements of practice without in any manner departing from the spirit or scope of the present invention.

What is claimed is:

1. For use in flash photography, the combination comprising:
    socket means for receiving a plurality of flash lamps, said socket means including a plurality of pairs of electrical contacts, each of said pairs of contacts being positioned for operative engagement with the electrical leads of a flash lamp, and
    circuit means, including a plurality of signal means connected to said plurality of pairs of electrical contacts, for indicating the number of successive, good flash lamps starting with the flash lamp which is in firing position.

2. For use in flash photography, the combination comprising:
    socket means for receiving a plurality of flash lamps, said socket means including a plurality of pairs of electrical contacts, each of said pairs of contacts being positioned for operative engagement with the electrical leads of a flash lamp, said plurality of pairs of contacts being arranged in a predetermined sequence corresponding to the sequence in which the flash lamps are to be fired, and
    circuit means, including a plurality of signal means connected to said plurality of pairs of electrical contacts, for indicating, when said circuit is energized, the number of successive good flash lamps in said sequence.

3. For use in flash photography, the combination comprising:
    socket means for receiving a plurality of flash lamps, said socket means including a plurality of pairs of electrical contacts, each of said pairs of contacts being positioned for operative engagement with the electrical leads of a flash lamp,
    means for firing, in a predetermined sequence, the flash lamps inserted into said socket means, and
    circuit means, including a plurality of signal means connected to said plurality of pairs of contacts, for indicating, when said circuit is energized, the number of successive good flash lamps in said sequence.

4. For use in flash photography, the combination comprising:
    socket means for receiving a plurality of flash lamps, said socket means including a plurality of pairs of electrical contacts, each of said pairs of contacts being positioned for operative engagement with the electrical leads of a flash lamp, said plurality of pairs of contacts being arranged in a predetermined sequence corresponding to the sequence in which the flash lamps are to be fired,
    circuit means, including a plurality of signal means connected to said plurality of pairs of contacts, for indicating the number of successive, good flash lamps in said sequence, and
    a synchroflash circuit including a switch and a pair of electrical leads connected to said socket means and positioned for operative engagement with the electrical leads of a flash lamp for firing the flash lamp.

5. The apparatus according to claim 4 in which said pair of electrical leads of said synchroflash circuit is permanently connected to one of said pair of electrical contacts.

6. In a photographic camera of the type for use with an indexable multilamp flash attachment, the combination comprising:
    an indexable socket assembly for receiving said attachment;
    a plurality of electrical contacts for selective engagement with a portion of said attachment upon insertion of the attachment into said socket;
    signal means operatively associated with said contacts and adapted to indicate to the operator the number of successive unused flashbulbs in said attachment; and
    a synchroflash circuit in said camera wherein said least two of said electrical contacts constitute a portion of the camera synchroflash circuit and are positioned for engagement of at least one of said flashbulbs to allow actuation thereof by said synchroflash circuit.

References Cited

UNITED STATES PATENTS

| | | | |
|---|---|---|---|
| 996,489 | 6/1911 | Key | 340—251 |
| 2,557,531 | 6/1951 | Blanchet | 240—37.1 |
| 2,672,039 | 3/1954 | Schwartz et al. | 95—115 XR |
| 2,911,809 | 11/1959 | Nojiri | 67—31 |
| 3,096,025 | 7/1963 | Prochnow | 240—37 XR |

NORTON ANSHER, *Primary Examiner.*
FRED L. BRAUN, *Assistant Examiner.*

UNITED STATES PATENT OFFICE
CERTIFICATE OF CORRECTION

Patent No. 3,380,357                        April 30, 1968

Donald M. Harvey

It is certified that error appears in the above identified patent and that said Letters Patent are hereby corrected as shown below:

Column 4, line 58, "wherein said" should read -- wherein at --.

Signed and sealed this 30th day of September 1969.

(SEAL)
Attest:

Edward M. Fletcher, Jr.
Attesting Officer

WILLIAM E. SCHUYLER, JR.
Commissioner of Patents